H. C. COLE & E. D. SABIN.
Sap-Protectors.
No. 140,185. Patented June 24, 1873.
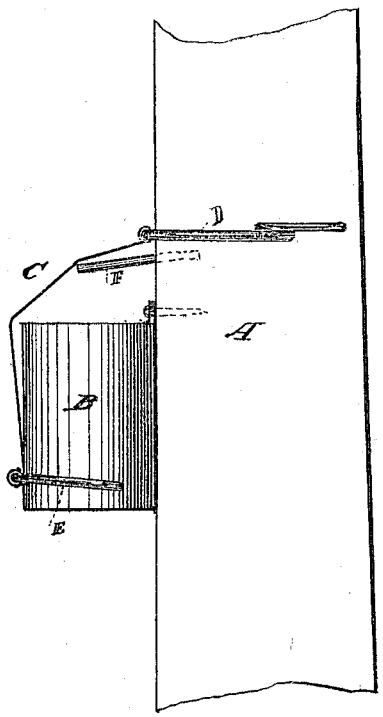
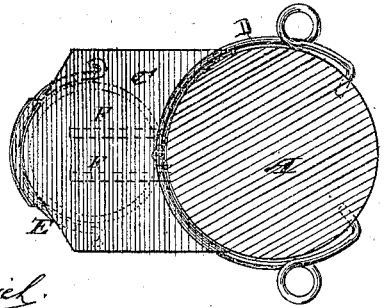

UNITED STATES PATENT OFFICE.

HENRY C. COLE AND EDGAR D. SABIN, OF WALLINGFORD, VERMONT.

IMPROVEMENT IN SAP-PROTECTORS.

Specification forming part of Letters Patent No. 140,185, dated June 24, 1873; application filed May 17, 1873.

*To all whom it may concern:*

Be it known that we, HENRY C. COLE and EDGAR D. SABIN, of Wallingford, in the county of Rutland and State of Vermont, have invented a new and useful Improvement in Sap-Protectors, of which the following is a specification:

The object of this invention is to provide means for protecting maple sap, as it is caught in buckets from the tree, from snow, rain, leaves, dirt, &c.; and it consists in a screen or cover attached to the tree and to the bucket, and covering the sap-bucket, as hereinafter described.

In the drawing, Figure 1 is a side view, showing the bucket and protector attached to the tree as when in use. Fig. 2 is a cross or horizontal section.

Similar letters of reference indicate corresponding parts.

A is the tree. B is the bucket. C represents the shield or protector.

This protector is made of cloth or of any flexible or other material, preferably waterproof, attached to a band of wire or cord, which is fastened to or around the tree. If it is a metallic or wire band it is fastened by means of its elasticity or spring of its ends. If a cord is used it may be tied around the tree. The lower end of the protector is fastened to the bucket in the same manner.

In this example we show the protector fastened to the tree and to the bucket by wires which spring and clasp the bucket and the tree. D is the band to which the protector is attached, and which clasps the tree. E is the band which is attached to the lower end of the protector and clasps the bucket. F F are conductors or tubes which penetrate the tree and conduct the sap into the bucket. These tubes, it will be seen, are beneath the protector.

With this covering the sap is protected from snow or rain as well as from leaves and other foreign matters.

Having thus described our invention, we claim as new and desire to secure by Letters Patent—

A sap-protector attached to the tree and the bucket, substantially as shown and described.

HENRY C. COLE,
EDGAR D. SABIN.

Witnesses:
AL. A. MERRIFIELD,
BENJ. E. CRAPO.